US008954947B2

(12) United States Patent
Markovic et al.

(10) Patent No.: US 8,954,947 B2
(45) Date of Patent: Feb. 10, 2015

(54) FAST VARIABLE VALIDATION FOR STATE MANAGEMENT OF A GRAPHICS PIPELINE

(75) Inventors: Relja Markovic, Seattle, WA (US); Ramanujan Srinivasan, Seattle, WA (US); Samuel Glassenberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1227 days.

(21) Appl. No.: 11/478,285

(22) Filed: Jun. 29, 2006

(65) Prior Publication Data

US 2008/0005731 A1    Jan. 3, 2008

(51) Int. Cl.
G06F 9/44    (2006.01)
G06F 9/445    (2006.01)
G06T 15/00    (2011.01)

(52) U.S. Cl.
CPC .......... *G06F 9/44521* (2013.01); *G06F 9/4431* (2013.01); *G06T 15/005* (2013.01)
USPC ........................................................ 717/162

(58) Field of Classification Search
USPC .................................................. 717/162, 126
See application file for complete search history.

(56) References Cited

U.S. PATENT DOCUMENTS

| | | | |
|---|---|---|---|
| 6,070,202 A | 5/2000 | Minkoff et al. | |
| 6,189,105 B1 | 2/2001 | Lopes | |
| 6,243,107 B1 | 6/2001 | Valtin et al. | |
| 6,295,608 B1 | 9/2001 | Parkes et al. | |
| 6,374,145 B1 | 4/2002 | Lignoul | |
| 6,427,234 B1 | 7/2002 | Chambers et al. | |
| 6,560,711 B1 | 5/2003 | Given et al. | |
| 6,631,423 B1 | 10/2003 | Brown et al. | |
| 6,784,888 B2 | 8/2004 | Taylor et al. | |
| 6,828,978 B2 | 12/2004 | Buehler | |
| 6,910,106 B2 | 6/2005 | Sechrest et al. | |
| 6,943,800 B2 | 9/2005 | Taylor et al. | |
| 6,980,209 B1 | 12/2005 | Donham et al. | |
| 7,385,607 B2 | 6/2008 | Bastos et al. | |
| 7,451,432 B2 * | 11/2008 | Shukla et al. | ................. 717/106 |
| 7,546,602 B2 * | 6/2009 | Hejlsberg et al. | ............. 719/313 |
| 2001/0005209 A1 | 6/2001 | Lindholm et al. | |
| 2002/0021307 A1 | 2/2002 | Glenn et al. | |
| 2003/0084322 A1 | 5/2003 | Schertz et al. | |

(Continued)

OTHER PUBLICATIONS

Necula et al., Safe Kernel Extensions . . . , Oct. 1996, pp. 1-16.*

(Continued)

*Primary Examiner* — John Chavis
(74) *Attorney, Agent, or Firm* — Brian Haslam; Mike Allen; Micky Minhas

(57) ABSTRACT

In a state management system of an effects system implemented in a Graphics Processing Unit (GPU), techniques and technologies are provided for setting a value to particular variables at application run-time without validating the variables. For example, a compiled effects file comprising a number of variables can be loaded at application load time, and a generic, variable interface pointer for a particular variable of the effects file can be retrieved. A specialized variable interface pointer can then be generated which is associated with the particular variable by specifying a desired type of access that will be performed on the particular variable. At application run-time, the specialized variable interface can be used to set a value to each of the particular variables without validating the particular variables at application run-time.

20 Claims, 3 Drawing Sheets

(56) References Cited

U.S. PATENT DOCUMENTS

| | | | |
|---|---|---|---|
| 2004/0003370 | A1 | 1/2004 | Schenk et al. |
| 2004/0068627 | A1 | 4/2004 | Sechrest et al. |
| 2004/0237074 | A1 | 11/2004 | Aronson et al. |
| 2005/0097595 | A1 | 5/2005 | Lipsanen et al. |
| 2005/0105698 | A1 | 5/2005 | Patfield |
| 2005/0182962 | A1 | 8/2005 | Given et al. |
| 2005/0184853 | A1 | 8/2005 | Payne et al. |
| 2005/0243094 | A1 | 11/2005 | Patel et al. |
| 2006/0023915 | A1 | 2/2006 | Aalbu et al. |
| 2006/0055695 | A1 | 3/2006 | Abdalla et al. |
| 2006/0074736 | A1* | 4/2006 | Shukla et al. ............. 705/8 |
| 2006/0184401 | A1* | 8/2006 | DelGaudio et al. ......... 705/7 |
| 2007/0220525 | A1 | 9/2007 | State et al. |
| 2007/0234308 | A1* | 10/2007 | Feigenbaum et al. ....... 717/130 |

OTHER PUBLICATIONS

"Computer Internet Security protection against network security attacks", http://www.buildwebsite4u.com/articles/internet-security.shtml.

James Matt, "Locked", http://www.sharewaresoft.com/Locked-download-2148.htm.

Notice of Allowance cited in related U.S. Appl. No. 11/477,272 dated Mar. 28, 2011.

Chinese Office Action cited in Chinese Application No. 207780024522.3 dated Mar. 16, 2011.

Notice of Allowance cited in related U.S. Appl. No. 11/477,272 dated Dec. 16, 2010.

Non-Final Office Action cited in related U.S. Appl. No. 11/477,272 dated Mar. 11, 2009.

Final Office Action cited in related U.S. Appl. No. 11/477,272 dated Aug. 24, 2009.

Non-Final Office Action cited in related U.S. Appl. No. 11/477,609 dated Aug. 17, 2009.

Final Office Action cited in related U.S. Appl. No. 11/477,609 dated Nov. 12, 2009.

Non-Final Office Action cited in related U.S. Appl. No. 11/477,609 dated Dec. 24, 2008.

Final Office Action cited in related U.S. Appl. No. 11/477,609 dated May 14, 2009.

PLUS Search Results in U.S. Appl. No. 11/477,609 dated Aug. 19, 2008.

Notice of Allowance cited in related U.S. Appl. No. 11/477,609 dated Jan. 12, 2010.

Non-Final Office Action cited in related U.S. Appl. No. 11/477,272 dated Dec. 30, 2009.

Final Office Action cited in related U.S. Appl. No. 11/477,272 dated Apr. 30, 2010.

Non-Final Office Action cited in related U.S. Appl. No. 11/477,272 dated Aug. 3, 2010.

Notice of Allowance cited in related U.S. Appl. No. 11/477,272 dated Dec. 18, 2010.

International Search Report cited in related PCT Application No. PCT/US2007/013410 dated Dec. 7, 2007.

A.G.M. Cilio and H. Corporeal, Global Variable Promotion: Using Registers to Reduce Cache Power Dissipation, LNCS 2304, pp. 247-261, Springer-Verlag Berlin Heidelberg 2002.

"User-Configurable Automatic Shader Simplification", Fabio Pellacini, International Conference on Computer Graphics and Interactive Techniques, ACM SIGGRAPH 2005 Papers, Jul. 31-Aug. 4, 2005, pp. 445-452.

W. Ambrosch, M.A. Ertl, F. Beer, A. Krall, Dependence-Concious Global Register Allocation, Lecture Notes in Computer Science, vol. 782, Springer Berlin Heidelberg, 1994.

"Global Register Allocation at Link time", D. W. Wall, Proceedings of SIGPLANT '86; ACM, Jul. 1986.

"Combining Register Allocation and Instruction Scheduling", R. Motwani, K. Palem, V. Sarkar and S. Reyen, Courant Institute, New York University, Jul. 1995.

Notice of Allowance cited in U.S. Appl. No. 13/224,845 dated Jul. 3, 2012, 11 pgs.

Chinese Notice of Allowance cited in Chinese Application No. 200780024522.3 dated Jul. 5, 2012, 6 pgs.

Japanese Notice of Allowance cited in Japanese Application No. 2009-518138 dated Nov. 6, 2012, 5 pgs.

Reply Korean Office Action cited in Korean Application No. 10-2008-7031260 dated Jun. 27, 2012, 1 pg.

Korean Office Action cited in Korean Application No. 10-2008-7031260 dated Sep. 15, 2012, 2 pgs.

Reply Korean Office Action cited in Korean Application No. 10-2008-7031260 dated Nov. 2, 2012, 4 pgs.

Reply to Non-Final Office Action cited in U.S. Appl. No. 11/477,609 dated Nov. 2, 2009, 15 pgs.

Reply to Final Office Action cited in U.S. Appl. No. 11/477,609 dated Dec. 10, 2009, 10 pgs.

Reply to Non-Final Office Action cited in U.S. Appl. No. 11/477,609 dated Mar. 23, 2009, 16 pgs.

Reply to Final Office Action cited in U.S. Appl. No. 11/477,609 dated Jul. 27, 2009, 18 pgs.

Reply to Non-Final Office Action cited in U.S. Appl. No. 11/477,272 dated May 19, 2009, 14 pgs.

Reply to Final Office Action cited in U.S. Appl. No. 11/477,272 dated Oct. 26, 2009, 13 pgs.

Reply to Non-Final Office Action cited in U.S. Appl. No. 11/477,272 dated Mar. 12, 2010, 13 pgs.

Reply to Final Office Action cited in U.S. Appl. No. 11/477,272 dated Jun. 25, 2010, 13 pgs.

Reply to Non-Final Office Action cited in U.S. Appl. No. 11/477,272 dated Nov. 17, 2010, 19 pgs.

Notice of Allowance cited in U.S. Appl. No. 11/477,272 dated Aug. 11, 2011, 9 pgs.

Reply to Notice of Allowance cited in U.S. Appl. No. 11/477,272 dated Aug. 26, 2011, 9 pgs.

Reply to Non-Final Office Action cited in U.S. Appl. No. 13/224,845 dated Feb. 16, 2012, 9 pgs.

Notice of Allowance cited in U.S. Appl. No. 13/224,845 dated Mar. 7, 2012, 5 pgs.

Rely to Chinese Office Action cited in Chinese Application No. 200780024522.3 dated Jul. 28, 2011, 5 pgs.

Second Chinese Office Action cited in Chinese Application No. 200780024522.3 dated Mar. 12, 2012, 6 pgs.

Reply to Second Chinese Office Action cited in Chinese Application No. 200780024522.3 dated May 18, 2012, 4 pgs.

Japanese Office Action cited in Japanese Application No. 2009-518138 dated Mar. 5, 2012, 1 pg.

Reply to Japanese Office Action cited in Japanese Application No. 2009-518138 dated May 21, 2012, 2 pgs.

Reply to Mexican Office Action cited in Mexican Application No. MX/a/2008/015162 dated Oct. 20, 2011, 1 pg.

Mexican Notice of Allowance cited in Mexican Application No. MX/a/2008/015162 dated Dec. 21, 2011, 2 pgs.

Korean Office Action cited in Korean Application No. 10-2008-7031260 dated May 8, 2012, 2 pgs.

Non-Final Office Action cited in U.S. Appl. No. 13/224,845 dated Nov. 17, 2011.

Preliminary Report on Patentability cited in PCT Application No. PCT/US2007/013410 dated Jan. 6, 2009.

Mexican Office Action cited in Mexican Application No. MX/a/2008/015162 dated Jun. 6, 2011.

* cited by examiner

FAST VARIABLE VALIDATION FOR STATE MANAGEMENT OF A GRAPHICS PIPELINE

BACKGROUND

Rendering and displaying three dimensional (3-D) graphics on screen typically involves many calculations and computations. In a simple graphics system, such computations occur according to some level of cooperative or shared processing by the central processing unit (CPU) and the graphics processing unit (GPU). In an exemplary scenario, after instructions are processed and some initial computations occur in the CPU, a set of coordinate points or vertices that define the object to be rendered are stored in video memory for further processing by the GPU in the graphics pipeline. When graphics programmers develop graphics applications via a set of available graphics APIs, the programmer generally indicates a set of vertices to be operated upon by a set of algorithmic elements. This data is sent into the graphics pipeline, and each vertex is streamed through a fixed set of GPU subunits in the graphics pipeline. One or more programmable shader units, sometimes referred to as shaders or "shader programs," can operate on the data and perform specialized operations on graphics data. As used herein, the term "shader" can be used to generically to refer to either the hardware subunit of the GPU that performs the shading or to refer to the set of instructions or tokens downloaded to the GPU that are subsequently loaded into memory, e.g., register storage, used by the shader (hardware) to perform the shading. The term "shader" can also refer to both working together. Where the term "subunit" is also used in connection with the term "shader," the term "shader" should be construed to refer to the subunit of the GPU that performs the processing associated with the shading. The term "shader program" can generally refer to computer programs or processes, that reside and run in the graphics pipeline, which can be used to help determine/define the final, on-screen surface properties of an image or object in a 3D on-screen environment. "Shaders" can perform billions of computations a second in order to perform their specific tasks. Shaders can include, for example, vertex shader(s), geometry shader(s) and pixel shader(s).

A single shader can receive different combinations of "shader constants." As used herein, the term "shader constant" can refer to different parameters or variables that are fed into a shader program that allow the shader program to produce different results based on the particular shader constants that are used. Shader programs can receive a range of different values for each shader constant. Shader constant variables to not change values during the invocation of that shader. Depending on the combination of particular shader constants that are provided, the output generated by the shader will vary. These shader constants can specify, for example, how pixels are combined, how data is read in and out, and in the case of a texture, how values are extracted from that texture. The process of shading is a computation intensive and complex process. When these specific shaders operate in a graphics pipeline, there are regular bottlenecks due to the operations that occur in each stage.

"State" refers to resources being interpreted by the shader program. As used herein, the term "resources" can refer to inputs used by a shader program and can encompass, for example, textures, samplers, constant buffers, or any other resource used by shader programs. At any given instance, the graphics pipeline contains a tremendous amount of dynamic state (rendering state, shaders, shader constant variables, resource/memory bindings, etc.). Different combinations of state enable various simulated materials and visual effects. One component of this state is a set of shader constants that need to be bound to the GPU before executing a shader program.

In the effects system, there are a number of effects that are being rendered by the graphics pipeline of the GPU. Because the hardware used to implement the graphics pipeline can be in only one configuration at any given instance, it is desirable to reduce time spent setting state (e.g., shader constants) and issuing commands to the GPU. The number of unique materials and effects that can be rendered in a frame is dictated by the performance of this system. In the process of rendering the GPU will consume variables and generate values used to produce various effects. The representation of each variables sent to the GPU can vary.

FIG. 1 is a flow chart showing a conventional handle-based technique 105 for setting a value to an effect variable in a state management system of a conventional effects system.

At step 110, when an effect variable (e.g., 5.5 f) is requested by an application at load time, a method (e.g., GetVariableByName) on the effect variable returns a handle (e.g., a number or other unique identifier) that points to the effect variable at step 120. This effect variable corresponds to a piece of device state that that is stored in memory, but that can not be used by the application. It should be appreciated that if a handle is requested that is not specified in the effects system, when the set method is called then the effects system may crash since it tries to operate on a null pointer.

Each of the variables must be "set" to a value by the application to achieve the desired effects. Before the application can set a value to the effect variable, the state management system of the GPU performs validation on the effect variable at run-time (step 130). Performing validation each time a value is set helps ensure that the value is represented in the correct form when the run-time engine calls the function. Validation involves a series of "checks" to make sure that the input and the output data types and alignments match up, that the caller has permissions to access the requested data, etc. In a handle based system such as that described in FIG. 1, only "slow paths" are provided. In other words, upon getting a handle, the state management system performs an internal lookup in a table to determine what the handle is pointing to, a type check to determine what type of variable the handle is referring to (e.g., if the variable type matches the variable type that is being passed in), a determination as to whether a transformation or conversion is necessary before setting the value, etc. The state management system of the GPU can therefore determine what the GPU is expecting, what variable type is being provided, whether a conversion/transpose is needed (i.e., is the variable type being passed in a type that is allowed, etc.). If input and output types do not match, some scenarios may call for a data conversion to occur. In other cases an error is returned. For instance, if the value that the GPU hardware will consume is expected to be specified as an integer, but the variable happens to be stored is a floating-point value, or vice-versa, the data types do not match up. As such, a conversion needs to be performed to convert the variable from the effects file to a floating point variable before a value can be set to the object. This can be referred to as a "slow path" for setting a value to the effect since a conversion will first be performed before the set can take place.

Once the effect variable has been validated the application knows how the effect variable is to be used. If a conversion is needed, the effect variable can then be modified by the application at step 140, and a value can be set as part of an effect by the state management system of the effects system at step 150. The value can be set, for example, using a generic SetValue method (pVar->SetValue(5.5 f)), where pVar is a generic variable pointer to the effect variable which tells the effects system to update the value of the effect variable.

SUMMARY

It would be desirable to reduce the time required when setting a value or values for each effect. It would be also be desirable to provide techniques for efficiently managing state to avoid redundant validation and setting of values.

Techniques and technologies are provided for setting a value to effect variables at application run-time without validating the effect variables. The disclosed techniques can utilize "strongly typed API handles" to allow validation operations to be performed at handle retrieval (e.g., prior to value-set time) so that the validation is only performed once when the handle is retrieved. The strongly typed API makes validation possible at compile time because all interfaces returned by the API have a type is known at compile time. Thus, validation and determination of necessary data processing can be performed when an application expresses intention to modify a specific data value within a technique (e.g., low-frequency, often not during frame rendering), as opposed to when the specific modification occurs (e.g., high-frequency, during frame rendering). As a result, validation does not have to be performed multiple times when the values are actually being set thereby reducing the work that needs to be done by the effects system at "set time." As such, the disclosed techniques allow the values to be set more rapidly.

For example, in a state management system of an effects system implemented in a Graphics Processing Unit (GPU), techniques and technologies are provided for setting a value to particular variables at application run-time without validating the variables. For instance, a compiled effects file comprising a number of variables can be loaded at application load time, and a generic, variable interface pointer for a particular variable of the effects file can be retrieved. A specialized variable interface pointer can then be generated which is associated with the particular variable by specifying a desired type of access that will be performed on the particular variable. At application run-time, the specialized variable interface can be used to set a value to each of the particular variables without validating the particular variables at application run-time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The systems and methods for fast validation of effect variables in a state management system of a graphics processing unit (GPU) are further described with reference to the accompanying drawings in which.

DETAILED DESCRIPTION

Figure 1:
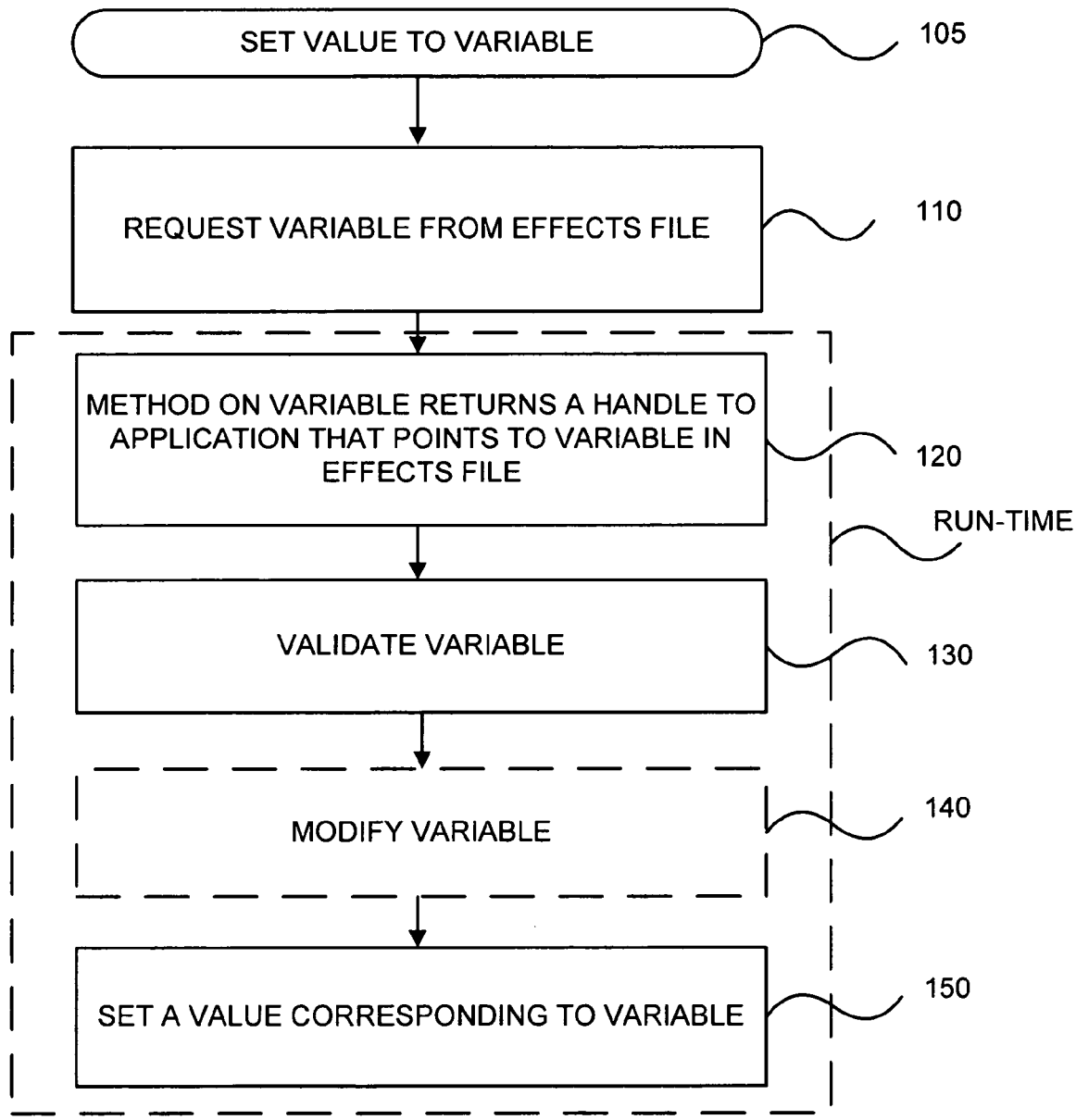
FIG. 1 is a flow chart showing a conventional handle-based technique for setting a value to an effect variable in a state management system of a conventional effects system.

The following detailed description is merely exemplary in nature and is not intended to limit the invention or the application and uses of the invention. As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims.

Descriptions of exemplary environments in which the disclosed techniques and technologies can be implemented are provided, for example, in U.S. patent application Ser. No. 11477609, entitled "Guided Performance Optimization for Graphics Pipeline State Management" filed concurrently herewith and assigned to the assignee of the present invention, and U.S. patent application Ser. No 11477272, entitled "Fast reconfiguration of Graphics Pipeline State" filed concurrently herewith and assigned to the assignee of the present invention, the contents of which are incorporated by reference in their entirety herein. The descriptions provided in these patent applications include descriptions of exemplary networked and distributed environments, exemplary computing devices, exemplary distributed computing frameworks or architectures, exemplary components of an exemplary 3D graphics system including a graphics subunit that includes a graphics processing unit (GPU), an exemplary hardware configuration for the associated graphics pipeline including descriptions of the various pipeline stages, as well as the hardware and software components of a common shader core which can be used in the various pipeline stages.

Terminology

As used herein, the term "object" refers to a single, run-time instance of a statically defined object type. Any working group of code and data can be considered an object. An object is an instance of a class and is the run-time manifestation (instantiation) of a particular exemplar of a class. Objects can be used to store data that needs to be shared, protected, named or made visible to user-mode programs. An object type comprises a system-defined data type, functions that operate on instances of the data type, and a set of object attributes. Objects act on each other. Each object is capable of receiving messages, processing data, and sending messages to other objects. Each object has its own data, though the code within a class (or a subclass or an object) may be shared for economy.

As used herein, the term "pointer" refers to a programming language datatype whose value refers directly to ("points to") another value stored elsewhere in the computer memory using its address. For example, a pointer may be declared to point to an integer; the language will then attempt to prevent the programmer from pointing it to objects which are not integers, such as floating-point numbers, eliminating some errors.

As used herein, the term "handle" refers to smart pointer. Handles are used when an application references blocks of memory or objects managed by another system, such as an operating system. While a pointer literally contains the address of the item to which it refers, a handle is an abstract reference controlled by a separate system. In some cases, handles can represent objects and provide a communication pathway between the operating system and user space. Handles can be considered a superset of pointers; pointers can be considered specialized handles, but not vice-versa.

As used herein, the term "method" can generally refer to an action, algorithm, function, or procedure. In the context of object-oriented programming, a method refers to an implementation of code responding to certain messages. A method defines how code can use an object of some class and is a form of subroutine operating on a single object.

As used herein, the term "compile time" refers to the time when a compiler compiles code written in a programming language into an executable form. A compiler will typically perform "semantic analyses" including, for example, syntax checking, which includes type checks and other processes.

As used herein, the term "load time" refers to the time before the application is fully initialized, including the time when the application is loaded but is still in the process of loading the data it needs.

As used herein, the term "run-time" refers to the process of carrying out the instructions of a computer program during the operation of the computer program. Run-time is the duration of the program's execution from beginning to termination, excluding the time the program is executing but still loading the data it needs.

As used herein, the term "value" refers to a number, literal string, array or anything that can be treated as if it were a number.

As used herein, the term "variable" refers to a place where a value can be stored in memory. A variable is usually represented by an alphanumeric string. More precisely, a variable binds (associates) a name (sometimes called an identifier) with the location; a value in turn is stored as a data object in that location so that the object can be accessed later via the variable.

Overview

Using the technique of FIG. 1, the effects system passes a handle into the effects file each time a value is to be set, and validation is performed each time a value is to be set (e.g., each time a SetValue method is called) because there is no guarantee that effect variable will be in the correct form when the application calls the function. However, not all values need to be validated. As such, many unnecessary validations are often performed on values that may not need to be validated or modified. This additional validation overhead increases the amount of time needed to make the call. When setting millions of values per frame at value set time, millions of validations (e.g., type checking, etc.) need to be performed. In aggregate, all of the unnecessary validation can reduce performance of the effects system such that less actual rendering can take place.

Techniques are provided for setting values to effect variables in a state management system of an effects system. In order to speed up the effects system, a "strongly typed handle" model is provided in which all data validation is performed at object-retrieval time, as opposed to value-set time, by using "strongly typed handles." Validation can be performed when an application expresses intention to modify a specific data value within a technique (low-frequency, often not during frame rendering), as opposed to when the specific modification occurs (high-frequency, during frame rendering). In the model, the caller lets the effect system know ahead of time all assumptions the caller is making about the underlying data. For instance, in one implementation, the caller lets the effects system know the name of the variable, the type of the variable, and the location where the variable resides before the effects system can access it. With all the assumptions out of the way and validated by the state management system, the resulting handle can implement a very lightweight path for data access.

Figure 2:
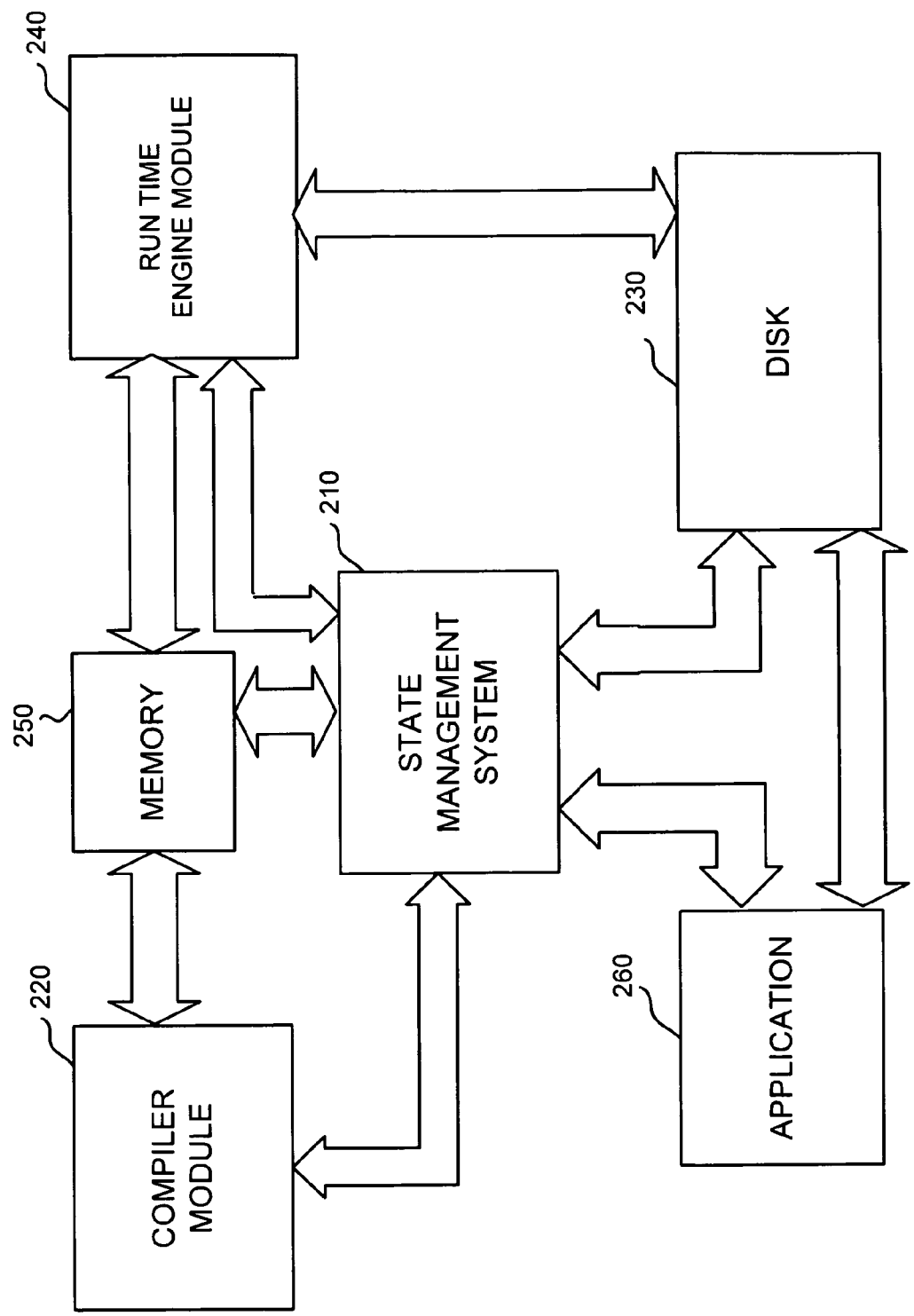
FIG. 2 is a simplified functional block diagram generally illustrating an effects system of a GPU.

FIG. 2 is a simplified functional block diagram generally illustrating an effects system 200 of a GPU according to an exemplary implementation. The effects system 200 comprises a state management system 210, a compiler module 220, a disk 230, a run-time engine module 240, a memory 250, and an application 260. The interaction between these components or modules will be described below with reference to FIG. 3 to describe how various modules in the effects system 200 interact when setting values to effect variables in a state management system of an effects system of a GPU.

Figure 3:
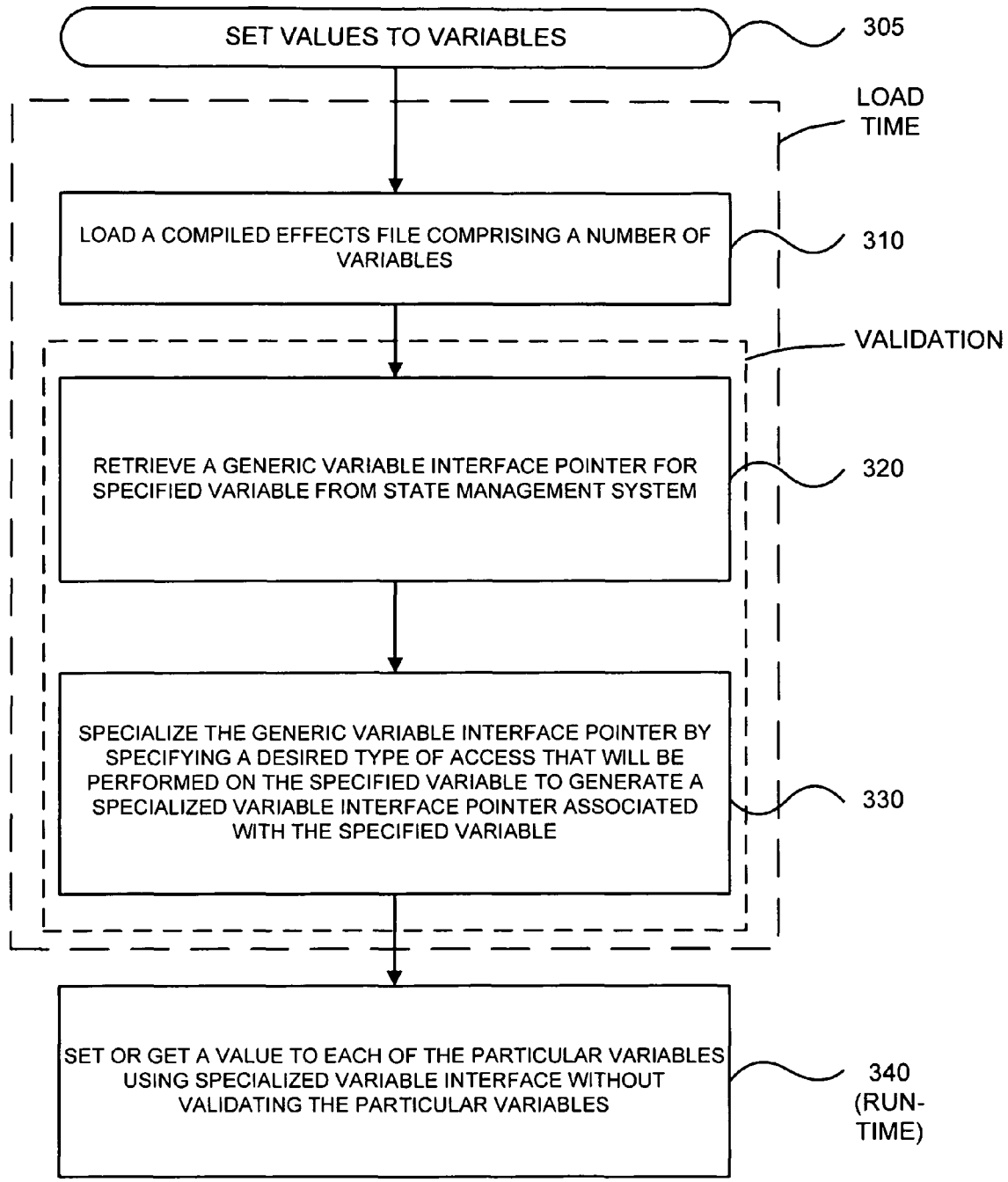
FIG. 3 is a flow chart showing a technique for setting values to effect variables in a state management system of an effects system of a GPU according to an exemplary implementation.

FIG. 3 is a flow chart showing a technique 305 for setting values to effect variables in a state management system of an effects system of a GPU. FIG. 3 will be described with reference the exemplary effects system 200 to FIG. 2. In the following description of FIG. 3 steps 310-330 occur at application load time, whereas step 340 occurs at application run-time.

Application Load Time

At step 310, during application load time, a compiled effects file is loaded from memory 250 into an effects system. The compiled effects file comprises a number of generic effects variables. Once the effects file is loaded, the validation process begins.

At step 320, during application load time, the application 260 retrieves a generic variable interface pointer for a specified variable (of the effects file) from the state management system. Thus, when the application 260 loads the effects file, the application 260 retrieves generic variable interface pointers from the effects system to all of the variables it needs to update. At this point, values are ready to be set regardless of whether or not a run-time conversion needs to happen. An example of this process will now be described with reference to equation (1).

Equation (1) below is an exemplary syntax in which, given a loaded effect ('myEffect'), a variable ('myFloatVar') is retrieved by name, and a variable pointer into a generic variable pointer ('pVar') of type 'IVariable' is stored.

$$IVariable*pVar=myEffect.GetVariableByName(\text{``myFloatVar''}); \quad (1)$$

In equation (1) "myFloatVar" is a effect variable that corresponds to a piece of device state (e.g., a value such as a light position being sent down to device). The effect variable "myFloatVar" is stored in memory 250 in "float1" representation. The expression IVariable*pVar is an untyped variable used to declare an interface to an object (without actually having the object), where IVariable is a generic variable interface, and pVar is a generic variable pointer to the effect variable myFloatVar that is used to tell the effects system to update the value of the effect variable myFloatVar (e.g., update the light position).

In equation (1), GetVariableByName is a method on the effect interface which returns a generic variable interface pointer to the effect variable named "myFloatVar." When GetVariableByName is called, if for some reason something is wrong in the way the effect variable has been specified (e.g., effect variable does not exist or effect variable type is inaccurate). A dummy object to a valid pointer will be returned that has a set method (e.g., you do not get a null). Thus, when a set call is made on the dummy object, the set call will simply be ignored. As such, if an effects file includes a variable that is not available, this can reduce the likelihood of a system crash (e.g., due to an invalid handle).

The effect variable "myFloatVar" will eventually be modified by the application 260 and set by the state management system as part of an effect at step 340. The application 260 can not use the effect variable as it is stored in memory 250. Before the effect variable "myFloatVar" can be used by the application 260, the application 260 needs to declare how the effect variable "myFloatVar" is to be used.

The generic, variable interface pointer comprises a method which specifies a set time format the application 260 anticipates/expects for any effect variable to be used in conjunction with the method (e.g., the format the application 260 would like to use to get and set the variable value). In other words, the set time format indicates the way the application 260 prefers to access any effect variable to be used in conjunction with the method so that the effects system automatically knows how to interpret the variable. For instance, the set time format could be (but is not limited to): integer, floating point, array, structure, object type, matrix, packed array, etc. These specialized classes are used to provide fast paths for common variable types (e.g., floats, float4s, common matrices, etc.)

In one implementation, the generic, variable interface pointer may comprise a method which specifies a "type" of the effect variable the application 260 anticipates/expects for any effect variable to be used in conjunction with the method. This way the compiler module 220 knows that the method expects the specified variable type. For instance, if the compiler module 220 knows that a given method expects, for example, a float, then the compiler can automatically determine whether or not the method is being provided with a float variable. As such, step 320 effectively allows all objects to be pre-validated when an effects file is loaded (e.g., is the application 260 getting data that it can consume). Because validation and mapping can be performed at step 320, when the value needs to be set at step 340, validation (e.g., type checking) does not need to be performed because the variable type is already known. As such, processing time can be saved.

At step 330, during application load time, the application 260 generates a specialized variable interface pointer associated with a specified variable. The application 260 specializes the generic variable interface pointer by specifying a desired type of access that will be performed on the specified variable. A "desired type of access" refers to the actual set time format of the input data via a given method (e.g., how the object is to be used, for example as float, as integer, as sampler state, etc.). This concept will be described below with respect to equation (3).

$$IFloatVariable*pFloatVar=pVar\text{->}AsFloat(\ );\qquad(2)$$

In equation (2), IFloatVariable is an untyped effect variable used to declare an interface to an object (e.g., in this exemplary syntax, a floating point variable), and pFloatVar is a floating point specialized variable interface pointer that is optimized for a certain type of value (in this case a floating point variable). The specialized variable interface pointer pFloatVar is used to express how the variable should be used and tells the effects system that generic, variable interface pointer pVar should be used as a floating point variable. In other words, if the pFloatVar variable is accessed using the SetFloat method, the value will be set with maximum speed. On the other hand, if the variable is accessed using the SetInteger method, the system will automatically convert the integer to a floating point value before changing the data. In one implementation, a specialized interface can be built for each combination or a subset of combinations possible. When the application requests to access a certain variable in a certain way, one of the prebuilt interfaces can be returned. This way, all validation and type checking happens when the generic variable interface pointer is retrieved at load time (step 320), and not when the variable value is being set at runtime (step 340). Thus, equation (2) effectively allows validation (e.g., type checking) and matching to be performed at object retrieval time (e.g., earlier in the process). Based on what the application 260 has told the effects system about the variable, validation can be skipped at run-time (step 340) when a value is to be set to the variable. As such, the application 260 only needs to retrieve the generic variable interface pointer once, but later on at step 340 the specialized variable interface pointer can be used to set or update the variable numerous times.

Application Run-Time

At run-time, step 340, specialized variable interface pointers can be used to set or get a value to each of the particular variables without validating the particular variables at application run-time. Each time a set or get is called at application run-time the values can be set every frame without validating the effect variables since the set time format is already known. The application 260 knows what needs to be done to set the value (e.g., nothing, fast copy to memory 250, conversion from integer to floating point value (or vice-versa), or transpose the matrix, etc.) without the need to perform validation (e.g., type checking) since validation already occurred at application load time (step 320).

For example, if the format of the effect variable matches the set time format, then the application 260 can set a value to each of the effect variables using a fast path without validating the effect variables at run-time. The application 260 can fast memcopy the effect variable to memory 250 (e.g., bits can just be copied over in a fast path).

If the format of the effect variable does not match the set time format, then the application 260 can automatically perform an "operation" on those effect variables to convert/modify their format to the set time format, and then set a value to each of the converted/modified effect variables at step 340 without validating the effect variables at application run-time. The operation may comprise any type of run-time conversion, including, but not limited to, conversion from integer value-to-floating point value, conversion from floating point value-to-integer value, transposing a matrix, packing and unpacking array data (arrays typically have different memory layouts in the GPU and on the CPU), as well as performing additional checks on object variables (e.g., textures, shader resource views, blend states). Thus, if the application 260 needs to perform a run-time conversion, it can be done automatically without type checking, etc.

An example of how the application 260 sets a value to each of the number of effect variables will now be described with reference to equation (2) above and equation (3) below.

$$pFloatVar\text{->}SetFloat(5.5f);\qquad(3)$$

Once the FloatVar is returned, SetFloat and GetFloat are called. In the exemplary syntax shown in equation (3), 5.5 f is a floating point effect variable, pFloatVar is a specialized variable interfacepointer to the floating point effect variable 5.5 f, and SetFloat is a method that only takes a floating point variable. When the effects system wants to update the value, it grabs the handle pFloatVar and using the SetFloat( ) method sets to the value to 5.5 f. As such, the effects system knows whether the variable is a floating point variable without performing any validation (e.g., type checking). For example, if the variable in the effects file is a floating point variable (and hence matches the variable type requested by the SetFloat( ) method), then no conversion is required to set the value to memory 250. Since the handle is strongly typed, the effects system knows that it will be receiving "float" input from the application 260. In other words, a "fast path" can be used (e.g., fast memcopy can be performed where the bits can just be copied over to memory 250 in a fast path). This greatly reduces set overhead and can allow the set to be performed as quickly as possible without performing type-checking to determine if the fast-path can be used. This can significantly improve performance since getting and setting occurs millions of times per second, but validation only needs to be performed one time for a given set time format.

If at a later point, the application 260 wishes to set an integer value to this variable (e.g., pFloatVar−>SetInt(5)), because the state management system knows that pFloatVar is a "float1" type, SetInt does not need to check any variable types. The state management system just knows that it needs to convert the input from am integer variable to a floating point variable. Thus, if a conversion does need to be performed, it can be done automatically without type checking.

There are multiple ways of implementing the present invention, e.g., an appropriate API, tool kit, driver code, operating system, control, standalone or downloadable software object, etc. which enables applications and services to use the systems and methods of the enhanced graphics pipeline invention. The invention contemplates the use of the invention from the standpoint of an API (or other software object), as well as from a software or hardware object that receives any of the aforementioned techniques, including techniques of the common core, the geometry shader or the stream output in accordance with the invention. Thus, various implementations of the invention described herein can have aspects that are wholly in hardware, partly in hardware and partly in software, as well as in software.

The underlying concepts can be applied to any computing device or system in which it is desirable to employ a GPU with an enhanced graphics pipeline. For instance, the algorithm(s) and hardware implementations of the invention can be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein can be implemented in connection with hardware or software or, where appropriate, with a combination of both. Thus, the methods and apparatus of the present invention, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that can implement or utilize the enhanced graphics pipeline techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language can be a compiled or interpreted language, and combined with hardware implementations.

The methods and apparatus of the present invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention can invariably be a combination of hardware and software.

While the present invention has been described in connection with the preferred embodiments of the various figures, it is to be understood that other similar embodiments can be used or modifications and additions can be made to the described embodiment for performing the same function of the present invention without deviating therefrom. For example, the methods, as described in the present application can apply to any computing device or environment, such as a gaming console, handheld computer, portable computer, etc., whether wired or wireless.

While exemplary embodiments refer to utilizing the present invention in the context of a graphics pipeline, the invention is not so limited, but rather can be implemented to provide a second processing unit. For instance, if the programmer wants to render a display to the screen and process the computational mathematics while performing another function using the CPU, the processing units can need to be utilized to their fullest, whether or not the graphical display is included in the final output. Still further, the present invention can be implemented in or across a plurality of processing chips or devices, and storage can similarly be effected across a plurality of devices. Therefore, the present invention should not be limited to any single embodiment, but rather should be construed in breadth and scope in accordance with the appended claims.

What is claimed:

1. In a state management system, a method comprising:
    generating at load time a specialized variable interface pointer associated with a variable comprised in a loaded compiled effects file by specifying a desired type of access that will be performed on the variable, where a generic variable interface pointer has been retrieved for the variable; and
    using a specialized variable interface to set a value to the variable at application run-time without validating the variable at application run-time.

2. The method in the state management system of claim 1, wherein using a specialized variable interface to set a value to the variable at application run-time without validating the variable at application run-time comprises:
    setting a value to the variable having a set time format at application run-time by fast copying the variable to memory without validating the variable at application run-time.

3. The method in the state management system of claim 1, wherein using a specialized variable interface to set a value to the variable at application run-time without validating the variable at application run-time comprises:
    automatically performing an operation on other variables having a different format than a set time format to convert the other variables to the set time format; and
    setting a value to the converted variables at application run-time without validating the converted variables at application run-time.

4. The method in the state management system of claim 3, wherein the operation comprises a run-time conversion.

5. The method in the state management system of claim 4, wherein the run-time conversion comprises at least one of:
conversion from integer value-to-floating point value,
conversion from floating point value-to-integer value,
transposing a matrix,
packing and unpacking array data, or
performing additional checks on object variables.

6. The method in the state management system of claim 1, wherein the specialized variable interface pointer specifies a set time format an application expects for the variable.

7. The method in the state management system of claim 6, wherein the set time format comprises a format used by the application to perform at least one of getting or setting values to the variable.

8. The method in the state management system of claim 1, wherein the specialized variable interface pointer specifies a variable type an application expects for the variable.

9. The method in the state management system of claim 1, wherein the variable comprises an effect variable.

10. A hardware computer storage memory, comprising an application programming interface (API) for instructing a graphics processing unit to:
generate at load time a specialized variable interface pointer associated with a variable comprised in a loaded compiled effects file by specifying a desired type of access that will be performed on the variable, where a generic variable interface pointer has been retrieved for the variable; and
use a specialized variable interface to set a value to the variable at application run-time without validating the variable at application run-time.

11. The hardware computer storage memory of claim 10, the API instructing the graphics processing unit to:
set a value to the variable having a set time format at application run-time by fast copying the variable to memory without validating the variable at application run-time.

12. The hardware computer storage memory of claim 10, the API instructing the graphics processing unit to:
perform an operation on other variables having a different format than a set time format to convert the other variables to the set time format; and
set a value to at least one of the converted variables at application run-time without validating the converted variables at application run-time.

13. The hardware computer storage memory of claim 12, wherein the operation comprises a run-time conversion.

14. The hardware computer storage memory of claim 13, wherein the run-time conversion comprises at least one of:
conversion from integer value-to-floating point value,
conversion from floating point value-to-integer value,
transposing a matrix,
packing and unpacking array data, or
performing additional checks on object variables.

15. The hardware computer storage memory of claim 10, wherein the specialized variable interface pointer specifies a set time format an application associated with the API expects for the variable.

16. The hardware computer storage memory of claim 15, wherein the set time format comprises a format used by the application to perform at least one of getting or setting values to the variable.

17. The hardware computer storage memory of claim 10, wherein the specialized variable interface pointer specifies a variable type an application associated with the API expects for the variable.

18. The hardware computer storage memory of claim 10, wherein the variable comprises an effect variable.

19. A method, implemented at least in part via a processing unit, comprising:
generating at load time a specialized variable interface pointer associated with a variable comprised in a loaded compiled effects file by specifying a desired type of access that will be performed on the variable, where a generic variable interface pointer has been retrieved for the variable; and
using a specialized variable interface to set a value to the variable at application run-time without validating the variable at application run-time.

20. The method of claim 19, wherein using a specialized variable interface to set a value to the variable at application run-time without validating the variable at application run-time comprises:
setting a value to the variable having a set time format at application run-time by fast copying the variable to memory without validating the variable at application run-time.

* * * * *